UNITED STATES PATENT OFFICE.

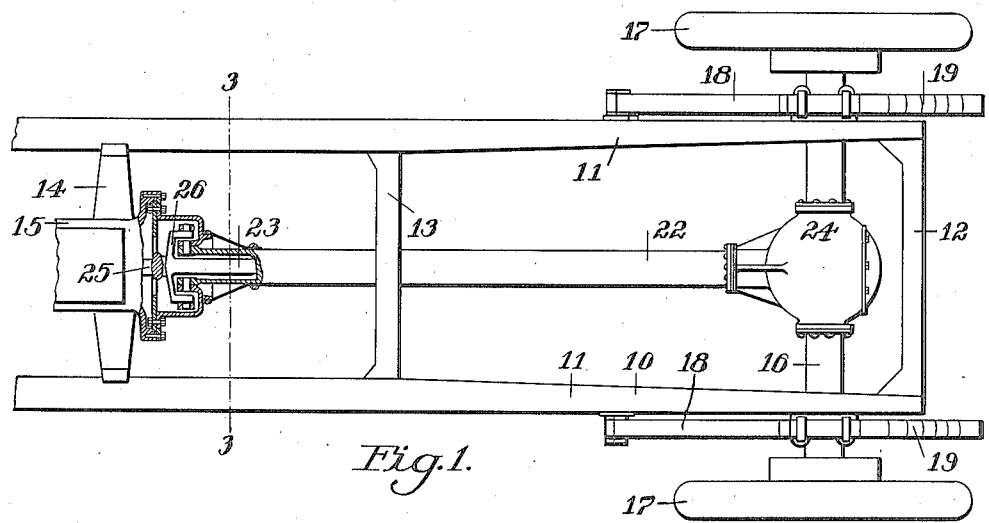
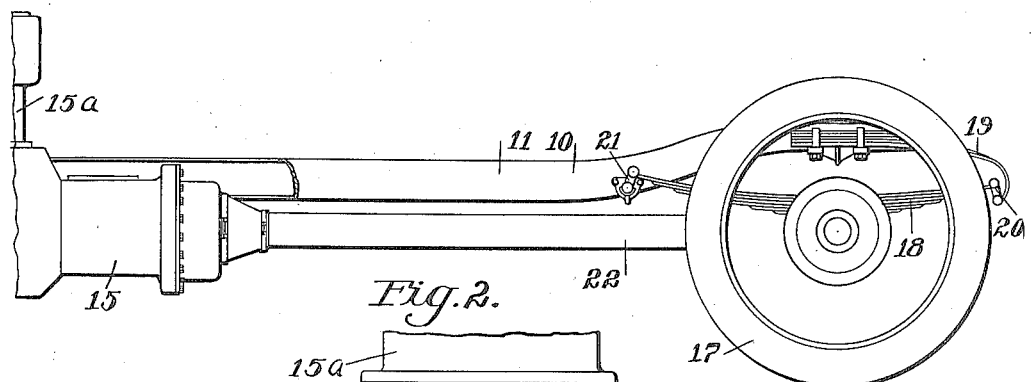
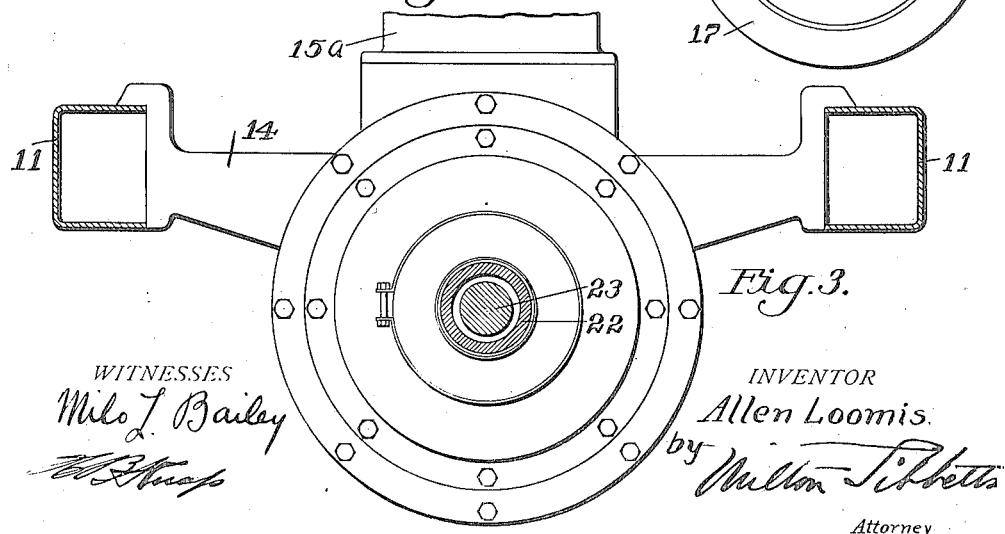

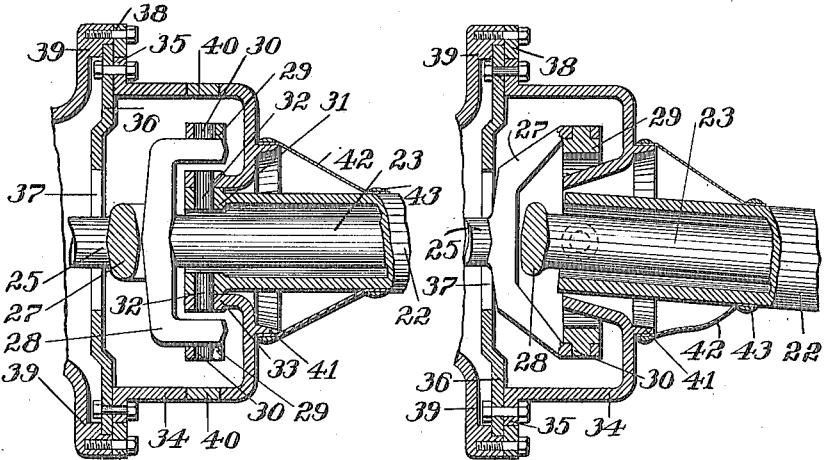
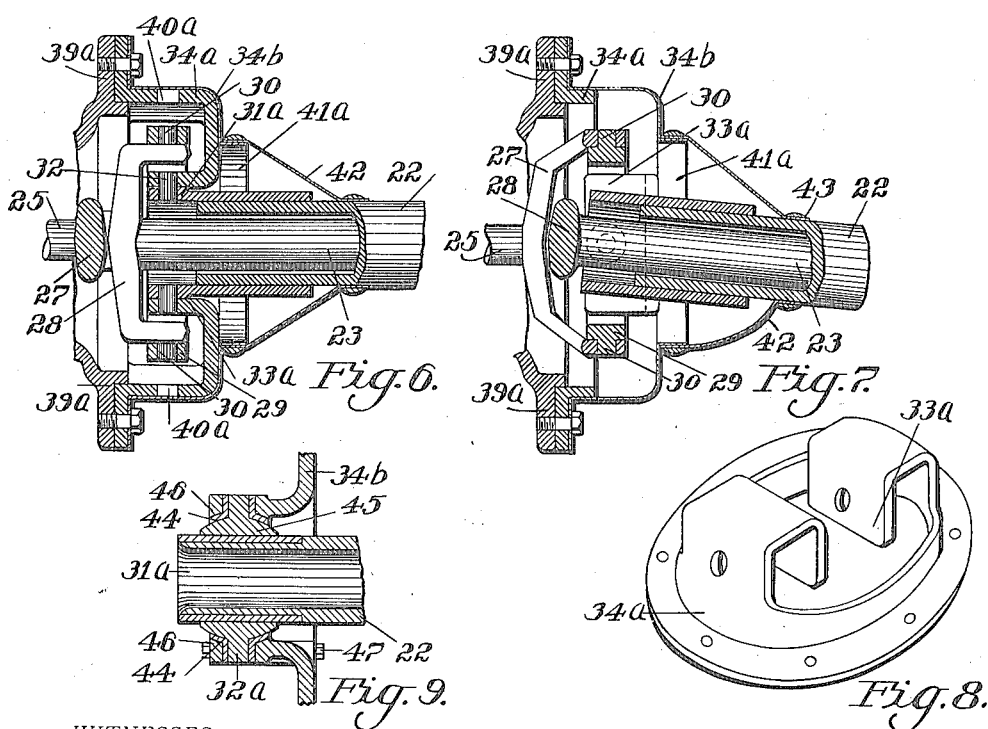

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,157,878. Specification of Letters Patent. Patented Oct. 26, 1915.

Application filed November 4, 1912. Serial No. 729,375.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to the frame, the driving axle, and connections.

The invention is illustrated in a motor vehicle having a rear driving axle upon which the frame is supported by springs so that there is a relative movement between the frame and axle. A forwardly extending torsion member has its front end supported from the frame so that the axle can freely oscillate vertically and have a reasonable amount of side sway, due to the elasticity of the supporting springs. In the connection of the torsion member to the frame, provision is also made for oscillation of the axle about the torsion member as a center, as when one only of the wheels falls into a hole or rut.

The torsion member is shown as of tubular form with the driving or propeller shaft passing through it, and the universal joint of the propeller shaft has its pivots substantially in line with the connecting means of the torsion member to the frame.

Heretofore there were two well known methods of connecting the front end of the torsion member to the frame, first, by means of a spherical joint surrounding the universal joint, and second, by trunnions at either side of the universal joint, the front end of the torsion member being forked to connect with the trunnions. The first of these methods is objectionable because of the necessarily large size of the spherical parts, causing considerable relative movement of the contact surfaces of the spherical parts and consequent wear and difficulties of lubrication; and the second method necessitates the trunnions being so far apart that they must be made exceptionally strong to withstand the side sway of the body and frame relative to the axle.

One of the objects of the present invention is to construct a torsion rod with a connection at its front end that will not have any of the objections above outlined.

Another object of the invention is to produce a motor vehicle in which the torsion of the driving axle is taken on a joint inside of the universal joint of the propeller shaft.

Another object of the invention is to produce a motor vehicle in which the front end of the torque member is supported inside of and free from the universal joint of the propeller shaft.

These and other objects of the invention are made clear in the following description, taken in connection with the drawings, which form a part of this specification; and in which, Figure 1 is a plan view of the rear end of a motor vehicle, showing the forward end of the torsion rod and its connection to the frame in section; Fig. 2 is a side elevation of the vehicle shown in Fig. 1, with parts broken away; Fig. 3 is a transverse section substantially on the line 3—3 of Fig. 1; Figs. 4 and 5 are enlarged horizontal and vertical sections, respectively, of the torque tube front end connections shown in Fig. 1; Figs. 6 and 7 are enlarged horizontal and vertical sections, respectively, of another form of torsion rod front end connections; Fig. 8 is a perspective view of the bracket used in the form of the device shown in Figs. 6 and 7; and Fig. 9 is a vertical section of a third form of torsion rod front end connection.

Referring to the drawings, 10 represents the vehicle frame comprising side bars 11 and cross bars 12, 13 and 14, the latter bar forming a support for the gear casing 15 and motor 15ª. The rear axle 16 and wheels 17 support the frame through springs at either side of the frame, shown in the drawings as each comprising a lower semi-elliptic member 18 and an upper scroll spring 19, these springs being connected at their rear end by links 20, and the member 18 being connected at its forward end to the frame side bar 11, as by a link or shackle 21. In vehicles in which the drive is transferred from the driving axle 16 to the frame through the springs themselves, the member 18 is connected to the frame by a pivot joint without any intermediate shackle. In such case, the front half of the member is usually made rather stiff to withstand the strains it incurs, due to transferring the drive. But with the member 18 shackled to the frame, as in the present case, the drive is transferred from the axle to the frame either through radius rods provided for the purpose, or through a torsion member, as shown in the drawings in the form of a forwardly extending tubular member 22. This tubular member in the present case is also connected to one of the cross members of the frame so that it not only takes the drive, but also resists the torsion of the driving axle. For this reason, it is frequently called a torque or torsion member or tube. In the present instance also this torsion member 22 forms a housing for the propeller or driving shaft 23, which extends directly through to, and connects with, the differential gears in the casing 24 of the driving axle 16.

The front end of the propeller shaft 23 connects with the driving shaft 25 by a universal joint 26, the shaft 25 extending from the rear end of the gear box 15, and is of course driven by the motor of the vehicle through suitable gears and clutch.

From the above description it will be seen that the axle 16 has considerable freedom to move relative to the frame 10, due to the elastic connection formed by the spring members 18 and 19. The axle of course oscillates in a substantially vertical plane with the universal joint 26 as a center; it oscillates somewhat with the longitudinal axis of the torsion tube 22 as a center, as when one of the wheels drops into a hole or runt and the other wheel perhaps is simultaneously raised by an obstruction in the road, and it moves bodily sidewise relative to the frame, as when the car is taking a turn or the wheels are following in winding ruts in the road, this action being well described by the well known term of "side sway." The first above mentioned movement of the axle in a substantially vertical plane may easily be taken care of by pivoting the forward end of the torsion tube on suitable horizontal trunnions, and the second movement of the axle may be taken care of by otherwise suitably connecting the torsion rod, as by telescoping it, but in order to take care of all of the various movements of the axle relative to the frame without placing too great a strain upon the torsion tube connections, the front end of the torsion tube must be connected to the frame by a joint of suitable elastic qualities and that is of considerable strength and of a type that can be readily and efficiently lubricated. A construction that meets these requirements and which forms the subject matter of this invention will now be described in detail.

The universal joint 26, hereinabove referred to as connecting the shaft 25 and propeller shaft 23, is in the form of a pair of yokes 27 and 28 connected together by a ring member 29 through pivots 30. The yokes, ring and pivots are arranged somewhat farther from the center of the shafts than is usual, so that the forward end 31 of the torsion tube 22 may extend into, and in fact be surrounded by, the universal joint, as shown clearly in Figs. 4 and 5. This end 31 of the torsion tube is provided with horizontal trunnions 32, which, as will be seen from Fig. 4, are very close together, in fact being separated only by the thickness of the shaft 23 with slight clearance. These trunnions are supported in the reëntrant part 33 of a bracket 34, which is in the form of a cylindrical casing in the construction shown in Figs. 4 and 5. This bracket or casing is provided with a flange 35, to which is secured a disk 36 having an opening 37 for the passage of the shaft 25; and this disk is secured between a ring 38 and a cylindrical bracket 39 mounted on the cross bar 14 or gear box 15, as shown in Fig. 1. The disk 36 has a slight movement between its securing members so that the slight oscillations of the torsion tube 22 about its longitudinal axis may be easily taken care of. At the same time all of the driving energy of the axle is transferred to the frame through this disk, and it is of sufficiently large diameter and surface to easily take care of the work thus put upon it. The casing 34 is shown with plugged holes 40, made necessary for the purpose of drilling the holes in the reëntrant part 33 for the trunnions 32.

It will be understood that the disk 36 extends inwardly toward the shaft 23 for the purpose of forming a baffle to prevent oil or grease in the casing 34 from being thrown by centrifugal force off of the universal joint and into the joint between the outer edge of the disk 36 and the parts 38 and 39. Thus the oil is retained in the casing 34, so far as the last mentioned joint is concerned. It will also be understood that the trunnions 32 are substantially in line with the pivots 30 of the universal joint, so that these parts will move about substantially the same center.

The casing 34 may be provided with a flange 41, to which is secured a flexible sleeve 42, the other end of which is secured around the tube 22, as at 43. This sleeve prevents oil escaping from this end of the casing and also excludes dust and dirt therefrom.

It will be seen that by having the trunnions 32 so close together, the side sway of the frame relative to the axle 16 will be practically nothing when it reaches these trunnions, and the elasticity of the parts such as the tube 22 and the casing 34 is amply sufficient to take care of these strains. Of course the oscillation of the axle 16 in a substantially vertical plane is taken care of by the movement of the tube 22 relative to the bracket 34, these parts turning on the trunnions 32.

Referring to Figs. 6, 7 and 8, it will be seen that the bracket $34^a$ is itself secured to the cylindrical extension $39^a$, and the reëntrant portions $33^a$ are of skeleton construction, the entire bracket being surrounded by a thin sheet metal casing 34<sup>b</sup>, which covers the holes 40<sup>a</sup> and has a flange 41<sup>a</sup> to which the flexible sleeve 42 is secured. The skeleton reëntrant portions 33<sup>a</sup>, here referred to, are clearly shown in the perspective view in Fig. 8.

The oscillation of the torsion tube 22 about its longitudinal axis is provided for by telescoping the tube, as shown clearly in Figs. 6 and 7, the forward end 31<sup>a</sup> surrounding the tube 22.

It will be understood that in such construction the vehicle is either provided with radius rods for transferring the drive of the rear axle to the frame, or the forward ends of the spring members 18 are directly pivoted to the frame for the same purpose.

In Fig. 9, the bracket 34<sup>b</sup> has the reentrant portions formed with spherical recesses 44, between which recesses a spherical piece 45 is adapted to be secured by caps 46 and bolts 47. This spherical piece slides on the forward reinforced end 31<sup>a</sup>, giving the same telescoping action that is secured by the construction shown in Figs. 6 and 7. Trunnion pieces 32<sup>a</sup> may also be provided, if desired, in order to still further strengthen this construction, but without the trunnion pieces this construction permits of a greater universal action between the tube 22 and its bracket 34<sup>b</sup> than is secured in either of the other constructions.

Having thus described my invention, what I claim and desire to secure by Letters Patent, is,

1. In a motor vehicle, the combination with, a driving shaft, a propeller shaft and a universal joint connecting said shafts, of a torque member pivotally supported inside of the pivots of said universal joint.

2. In a motor vehicle, the combination with, a driving shaft, a propeller shaft and a universal joint connecting said shafts, of a torque member pivotally supported with its pivots inside of, and substantially in line with, the pivots of said universal joint.

3. In a motor vehicle, the combination with, a driving shaft, a propeller shaft and a universal joint connecting said shafts, of a torque tube surrounding said propeller shaft and having its end extending into said universal joint, and a bracket also extending into said universal joint and trunnioned to said torque tube.

4. In a motor vehicle, the combination with, a driving shaft, a propeller shaft and a universal joint connecting said shaft, of a torque tube surrounding said propeller shaft and having its end supported on pivots inside of said universal joint.

5. In a motor vehicle, the combination with, a driving shaft, a propeller shaft and a universal joint connecting said shafts and having spaced trunnions, of a torque tube surrounding said propeller shaft, a casing for said universal joint having an inturned end, and a pivoted connection between said torque tube and the inturned end of said casing.

6. In a motor vehicle, the combination with the frame, the motor mounted thereon, the driving axle, and a propeller shaft connecting the motor with the driving members of the axle and having a universal joint therein, of a torque member connecting the axle and the frame and connected to the latter by horizontal trunnions inside said universal joint.

7. In a motor vehicle, the combination with the frame, the motor mounted thereon, the driving axle, and a propeller shaft connecting the motor with the driving members of the axle and having a universal joint, of a torque member connected to the axle and extending into said universal joint but disconnected therefrom, and a bracket swiveled on the vehicle frame and connected to, and supporting, said torque member.

8. In a motor vehicle, the combination with the frame, the driving axle, the springs, and links connecting the forward ends of the springs with the frame, of a torque member connected to the axle and extending to a point adjacent the frame, a bracket supporting the torque member and pivotally connected thereto, and a swivel joint connection between the bracket and the frame.

9. In a motor vehicle, the combination with the frame, the driving axle, the springs, and links connecting the forward ends of the springs with the frame, of a non-telescoping torque member connected to the axle and extending to a point adjacent the frame, and a bracket pivotally supporting the torque member and connected by a swivel joint with the frame.

10. In a motor vehicle, the combination with the frame, the motor mounted thereon, the driving axle, and a propeller shaft connecting the motor with the driving members of the axle and having a universal joint therein, of a telescoping torque member connecting the axle and the frame and connected to the latter by a joint inside said universal joint.

11. In a motor vehicle, the combination with the frame, the motor mounted thereon, the driving axle, and a propeller shaft connecting the motor with the driving members of the axle and having a universal joint therein, of a torque member connected to the axle and having pivots at its forward end inside said universal joint, and a bracket swiveled on the frame and connected to the pivots of said torque member.

12. In a motor vehicle, the combination with the frame, the motor mounted thereon, the driving axle, and a propeller shaft connecting the motor with the driving members of the axle and having a universal joint therein, of a torque member connecting the axle and the frame and connected to the latter by a joint inside said universal joint, and a casing mounted on the frame and housing both said joint and said connection.

13. In a motor vehicle, the combination with the driving shaft, the driving axle, and means for driving the axle from said shaft including a universal joint, of means for taking the torsion of the driving axle including a joint inside said universal joint.

In testimony whereof I affix my signature in the presence of two witnesses.

ALLEN LOOMIS.

Witnesses:
JOHN D. WILSON,
ALFRED H. KNIGHT.